US011265417B1

(12) United States Patent
Desnoyers et al.

(10) Patent No.: US 11,265,417 B1
(45) Date of Patent: *Mar. 1, 2022

(54) AC/DC PHONE LINE DETECTOR

(71) Applicant: West Corporation, Omaha, NE (US)

(72) Inventors: Yvon Desnoyers, Saint-Jean-sur-Richelieu (CA); Alain Gingras, Pierrefonds (CA); Gilbert Vellet, Laval (CA)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,726

(22) Filed: Jan. 15, 2019

Related U.S. Application Data

(63) Continuation of application No. 15/923,029, filed on Mar. 16, 2018, now Pat. No. 10,182,145.

(51) Int. Cl.
*H04M 1/56* (2006.01)
*H04M 15/06* (2006.01)
*H04M 3/22* (2006.01)
*H04M 3/42* (2006.01)

(52) U.S. Cl.
CPC ..... *H04M 3/2272* (2013.01); *H04M 3/42042* (2013.01)

(58) Field of Classification Search
CPC ...... H04M 1/573; H04M 3/005; H04M 15/00; H04M 15/06; H04L 12/10; H04Q 2213/13091; H04Q 2213/1322; H04Q 3/625; G01N 2291/0425; G01N 2291/2694; G01N 29/04; G01N 29/043; G01N 19/2475

USPC ........... 379/142.01, 142.04, 142.07, 142.12, 379/142.15, 142.17, 207.13, 207.15, 379/210.01, 245, 247, 387.01, 387.02, 379/399.01

See application file for complete search history.

(56) References Cited

U.S. PATENT DOCUMENTS

| | | | | |
|---|---|---|---|---|
| 4,366,347 A * | 12/1982 | Takatsuki | ............... | H04M 11/06 379/382 |
| 4,771,451 A * | 9/1988 | Ahuja | .................. | H03K 17/305 379/181 |
| 5,093,856 A * | 3/1992 | Atkinson | ............... | H04M 1/665 379/93.02 |
| 5,655,009 A * | 8/1997 | Arai | ..................... | H01M 2/1044 379/93.28 |
| 5,711,005 A * | 1/1998 | Farrag | .................. | H04W 72/02 455/441 |
| 5,970,128 A | 10/1999 | Kim | | |
| 6,344,809 B1 | 2/2002 | Kanekawa et al. | | |
| 6,359,973 B1 * | 3/2002 | Rahamim | ............ | H04M 11/066 379/90.01 |

(Continued)

*Primary Examiner* — Binh Kien Tieu

(57) ABSTRACT

An example AC/DC phone line detection system may include one or more of an electronic circuit that is floating with reference to ground, a first A/D converter coupled to the electronic circuit and configured to detect ringing voltages from DC voltages included in a telephone line, a second A/D converter coupled to the electronic circuit and configured to detect caller identification information from AC voltages included in the telephone line, and a processor configured to control signals detected by the first and second A/D convertors and output information about the signals to call taking equipment.

18 Claims, 4 Drawing Sheets

(56) References Cited

U.S. PATENT DOCUMENTS

| | | | |
|---|---|---|---|
| 6,731,950 B1 * | 5/2004 | Giles | H04M 1/725 |
| | | | 379/212.01 |
| 7,672,294 B2 * | 3/2010 | Wengrovitz | H04M 1/2535 |
| | | | 370/352 |
| 10,182,145 B1 * | 1/2019 | Desnoyers | H04M 19/00 |
| 2002/0067815 A1 * | 6/2002 | Kaplan | H04M 1/663 |
| | | | 379/201.01 |
| 2004/0208300 A1 | 10/2004 | Choi | |
| 2013/0225119 A1 * | 8/2013 | Borislow | G01S 5/0252 |
| | | | 455/404.2 |

* cited by examiner

AC/DC PHONE LINE DETECTOR

TECHNICAL FIELD

This application generally relates to a microcontroller for monitoring a telephone line, and more particularly, to a system and method which can detect information from AC and DC voltage of a telephone line while maintaining a high enough common mode rejection for all orders of harmonics of a standard harmonic frequency (e.g., 60 Hz, etc.)

BACKGROUND

Electrical systems and communication cabling systems including emergency call taking systems including 911, E911, public-safety-access points (PSAPs), nurse/hospital equipment, and the like, require grounding of the equipment in order to satisfy safety standards (e.g., UL requirements, etc.) Electrical cabling communication systems that are required to be grounded must be connected to the earth. The grounding mechanism must provide a reliable means to safely conduct voltages which can be interrupted or rapidly affected by other sources such as lightning, line surges, unintentional contact with high voltage lines or equipment to ground, and the like. By effectively grounding telecommunication equipment, the equipment and the phone service can be protected, personal safety can be ensured when workers and others are exposed to the equipment, system performance can be ensured, and the like.

In emergency call taking equipment, there is also a requirement to detect and decode caller ID information from the phone line. Unlike non-emergency equipment which is completely floating and present a longitudinal balance to the telephone line, emergency equipment that is grounded can struggle to generate enough common mode rejection ratio. In some environments, the phone line may include common mode (e.g., 60 Hz common mode). In these situations, a portion of the 60 Hz harmonics, which can be up to or more than 4000 Hz, can be translated as differential mode signals that prevent the emergency call taking equipment from properly detecting caller ID information.

SUMMARY

In one example embodiment, provided is an AC/DC telephone line detection system that may include one or more of an electronic circuit that is floating with reference to ground, a first A/D converter coupled to the electronic circuit and configured to detect ringing voltages from DC voltages included in a telephone line, a second A/D converter coupled to the electronic circuit and configured to detect caller identification information from AC voltages included in the telephone line, and a processor configured to control signals detected by the first and second A/D converters and output information about the signals to call taking equipment.

In another example embodiment, provided is a telephone system that may include one or more of call taking equipment including a display, and a microcontroller configured to detect caller identification (ID) information from a telephone line being input to the telephone system and output the detected caller ID information to the display, wherein the microcontroller may include an electronic circuit that is floating with reference to ground, a first A/D converter coupled to the electronic circuit and configured to detect ringing voltages from DC voltages included in a telephone line, a second A/D converter coupled to the electronic circuit and configured to detect caller identification information from AC voltages included in the telephone line, and a processor configured to control signals detected by the first and second A/D converters and output information about the signals to the call taking equipment.

In another example embodiment, provided is a method that may include one or more of receiving a telephone signal via a telephone line between call taking equipment and a central office, the telephone signal comprising alternating current (AC) and direct current (DC) voltages, detecting, via a first analog-to-digital (A/D) converter, ringing voltages from DC voltages included in the telephone signal, detecting, via a second A/D converter, caller identification information from AC voltages included in the telephone signal, and controlling, via a processor, signals detected by the first and second A/D converters and outputting information about the signals to the call taking equipment, wherein the first A/D converter, the second A/D converter, and the processor, are electronically connected to each other and coupled to an electronic circuit that is floating with reference to ground.

Other features and modifications may be apparent from the following description when taken in conjunction with the drawings and the claims.

BRIEF DESCRIPTION OF THE DRAWINGS

For a proper understanding of the examples described herein, reference should be made to the enclosed figures. It should be appreciated that the figures depict only some embodiments and are not limiting of the scope of the present disclosure.

DETAILED DESCRIPTION

Figure 1:
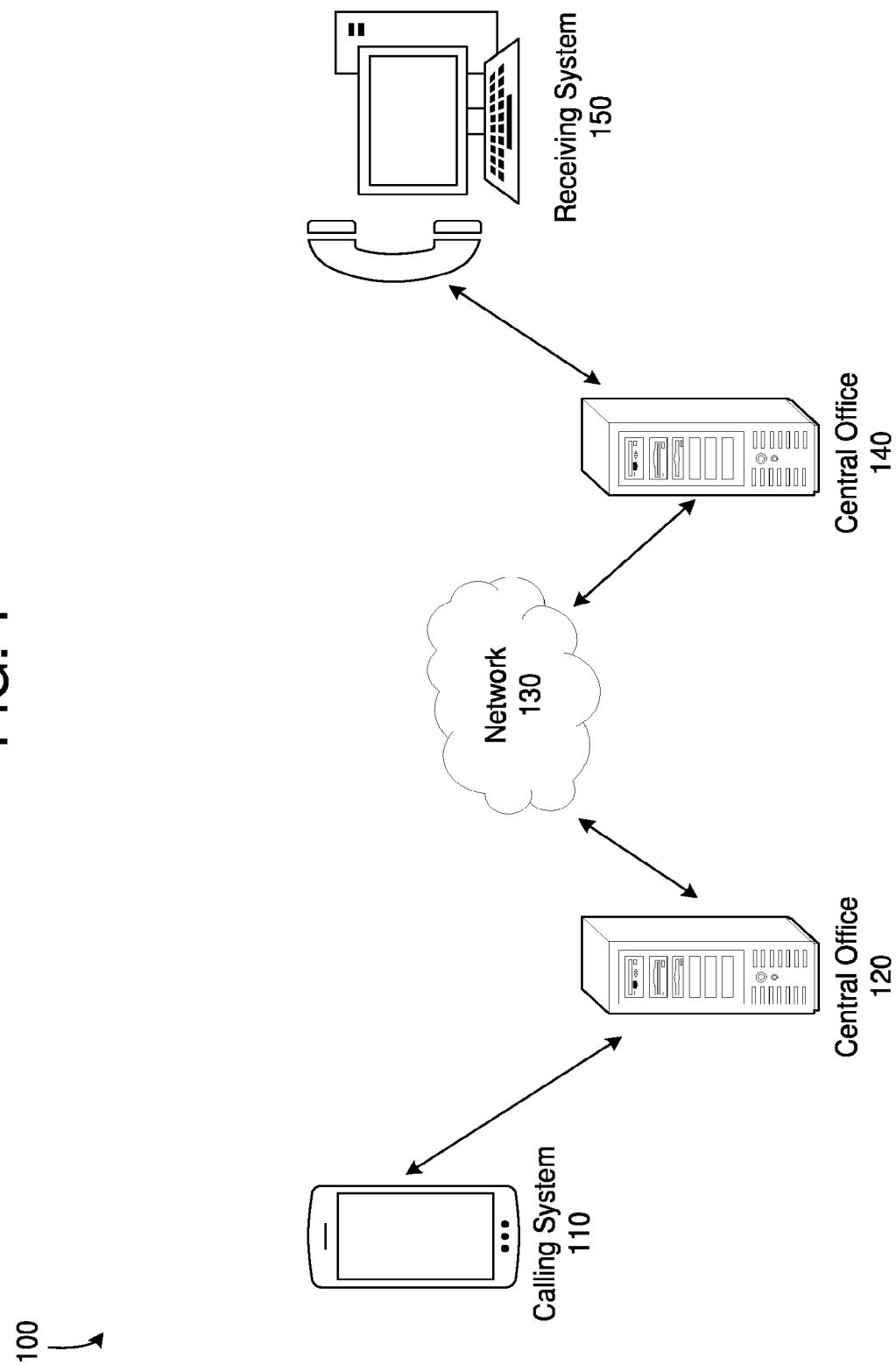
FIG. 1 is a diagram illustrating a telephone communication network in accordance with an example embodiment.

It will be readily understood that the components of the present application, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The features, structures, or characteristics as described throughout this specification may be combined in any suitable manner throughout the embodiments. In addition, the usage of the phrases such as "example embodiments", "some embodiments", or other similar language, throughout this specification is used to indicate that a particular feature, structure, or characteristic described in connection with the embodiment may be included in the at least one embodiment and is not to be construed as being omitted from other embodiments. Thus, appearances of the phrases "example embodiments", "in some embodiments", "in other embodiments", or other similar language, may be used to refer to the same group of embodiments, and the described features, structures, or characteristics may be combined in any suitable manner in one or more embodiments.

In addition, while the term "message" may be used in the description of embodiments, the application may be applied to many types of network data, such as, packet, frame, datagram, etc. The term "message" or "request" may include packet, frame, datagram, and any equivalents thereof. Furthermore, while certain types of messages and signaling requests may be depicted in example embodiments they are not limited to a certain type of message, and the application is not limited to a certain type of signaling.

The instant application relates to a microcontroller circuit that may monitor and detect call information from alternating current (AC) and direct current (DC) voltages included in a telephone signal. The microcontroller circuit can be embedded within, coupled to, or otherwise connected to a telephone system such as an emergency call taking position which is connected to ground. Emergency call taking systems including 911, E911, public-safety-access points (PSAPs), nurse/hospital equipment, and the like, require grounding of the equipment in order to satisfy safety standards (e.g., UL requirements, etc.) According to various aspects, the microcontroller includes an electronic circuit board that is floating with reference to ground. That is, the electronic circuit board may include a voltage that is not connected by any conducting path (including resistors) to ground or that is otherwise floating with respect to ground. In this case, the call taking position may be grounded but the microcontroller may not be connected to earth or another circuit that is grounded.

The microcontroller may include a plurality of analog-to-digital (A/D) converters that are configured to detect different signals from different portions of an incoming telephone signal. For example, the microcontroller may include a first A/D converter that detects ringing voltages from a DC voltage included in the telephone line and a second A/D converter that detects caller identification information from AC voltages included in the telephone line. The microcontroller may also include a power source that can maintain a voltage in isolation between the telephone line and the call taking equipment to withstand surges. According to various aspects, the microcontroller circuit may generate a high common mode rejection ratio such that caller ID information can be detected regardless of the harmonics of the telephone signal.

A telephone line consists of two wires which are referred to as tip and ring that transport a differential signal, meaning a signal that is of opposite phase on each wire. When a signal increases on one wire, it decreases on the other wire. Telephone equipment is designed to operate with differential signals. A common mode signal is a signal that has the same phase on both wires. When one wire signal increases, the signal on the other wire increases proportionally. Telephone equipment is not designed to work with common mode signals and is actually disturbed by it.

Common mode signals, mainly 60 Hz and its spectral components, are caused by a telephone cable running along power lines in telephone poles for miles. The two cables run in proximity to each other for miles which causes the telephone to "pick up" some 60 Hz signal along the way. This 60 Hz signal is picked up equally by both wires in the telephone line, creating common mode on the line. 60 Hz common mode is undesirable on a telephone because it can create a loud distinctive "hum" noise that is continually present. If the Common Mode Rejection Ratio (CMRR) of the telephone equipment is high, the 60 Hz signal and is spectral components (multiples of 60 Hz that can be present with the 60 Hz, such as 120 Hz, 180 Hz, up to 3600 Hz) will be eliminated and the caller or call taker will not hear the unwanted noise. If the CMRR is not high enough, a portion of the common mode noise is converted into differential noise and becomes audible on the telephone equipment. Usually, the higher the frequency the lower the CMRR of the equipment. This can create noisy calls where it is almost impossible to hear the caller during an emergency call or the caller can be heard over the noise, but some details of the environment of the caller that could be critical to the proper response of the call taker can be lost into the noise.

The example embodiments describe a microcontroller that incorporates multiple A/D converters. The signals from the analog input circuits are fed to the inputs of the two A/D converters. All of the outputs of the A/D converters on the micro controller are then multiplexed onto a Time Division Multiplexed (TDM) bus that is then transmitted, through a 1500V isolation barrier, to the ARM processor (CPU) of the product. Both converters have their own connection to the telephone line. The high voltage converter has a direct connection to the line, therefore detecting both AC and DC voltages. The low level converter has an AC coupled connection to the line, meaning that it only detects the AC voltages and filters out the DC voltage. This allows the high level converter to detect both the ringing voltage and the DC battery while the low level converter only needs to detect the voice and caller ID signals. The microcontroller removes common mode from the line in comparison to related call taking equipment.

Ideally, it would be preferable to have only one converter that would detect all the signals. Unfortunately, this is not practical because the high level signals need to be attenuated to be measured properly by a low level circuitry while the low level AC signals need to be amplified to be measured properly. Accordingly, the microcontroller of the example embodiments has two different similar converters, but having two different analog inputs, one that is an attenuator and the other that is DC blocking and has a gain.

FIG. 1 illustrates a telephone communication network 100 in accordance with an example embodiment. As an example, the telephone network 100 may be include a telecommunications network used for connecting and maintaining telephone calls between two or more parties. Examples of a type of network that may be included in the telephone network 100 include a landline network where the telephones are directly wired into a telephone exchange (also referred to as a public switched telephone network or PSTN), a wireless network in which telephones are mobile and can move around anywhere within the coverage area, a private network where a closed group of telephones are connected primarily to each other and use a gateway to reach the outside world which is referred to as a private branch exchange (PBX), an Integrated Services Digital Network (ISDN), and the like.

A telephone call represented by a telephone signal travelling through the telephone network 100 may carry voice transmission from a telephone, data transmission (e.g., when the calling party and called party are using modems), facsimile transmission (e.g., fax machines), and the like. The call may use a land line, a mobile phone, a satellite phone, any combination thereof, and the like. The telephone line may refer to a direct connection to a telephone line outside of a building, also referred to as an "analog line", or "POTS line" (Plain Old Telephone Service), in other words a standard residence type phone line. The POTS line is the line you will need for your remote broadcast console, telephone hybrid, analog telephone, cordless telephone, fax machine, or modem. The telephone line may include two wires called tip and ring. These two wires may provide DC current to power the telephone electronics, AC current to ring the telephone bell or electronic ringer, and a full duplex balanced voice path.

The signal on a tip/ring pair may be full duplex, balanced bi-directional audio. This design allows signals to travel for miles without expensive shielding by using common mode rejection to remove noise that is induced onto both wires. In order to send and receive audio through the pair, the network 100 may include a two wire to four wire hybrid circuit which converts the pair into separate transmit and receive audio paths. Bulky and expensive hybrid transformers have been replaced in most telephones by integrated circuits which perform the same function. Whether it is a transformer or IC, the hybrid should provide at least 1500 volt isolation and surge suppression from lightning strikes to satisfy standards/requirements. For example, UL stands for Underwriter's Laboratory. It is an American safety consulting and certification company. The UL requirements include 60950-1. This is a standard that specifies requirements intended to reduce risks of fire, electric shock or injury for the user who may come into contact with the equipment. This standard has been harmonized almost worldwide. If lightning strikes a telephone cable or if a telephone cable is subjected to a power cross (a 2 kV to 35 kV electrical distribution cable falls or somehow touches a telephone cable), a surge voltage of up to 1500V can be present on the telephone equipment. A 1500V isolation guarantees that the equipment connected to the line will not be damaged or a person on the phone at that moment will not be hurt by the voltage surge.

In the example of FIG. 1, a calling system 110 is connected to a receiving system 150 via a communication network 130 which may include telephone, mobile, satellite, and the like. As an example, the receiving system 150 may be an emergency call taking position that includes or consists of a public-safety answering point (PSAP), however, the receiving system 150 may include a non-emergency call system as well. In the example of the emergency all talking station, the receiving system 150 may include a phone, a computing system, network connectivity, a display, and the like, and may connect to telephone and Internet networks. The receiving system 150 may include a dispatch application for dispatching emergency responders, a computer animated design (CAD) system and/or a geographical information system (GIS) for generating maps and geographical information about the caller, a call taking application, and the like. An operator may interact with the receiving system 150 via a headset, a telephone, a screen, and/or the like.

FIG. 1 also includes multiple central offices 120 and 140 which are used to connect the calling system 110 and the receiving system 150. The central offices 120 and 140 may be part of a telephone exchange used in a public switched telephone network or in large enterprises. An exchange consists of electronic components that interconnect (switch) telephone subscriber lines or virtual circuits of digital systems to establish telephone calls between subscribers. As an example, a central office may be defined as a building used to house the inside plant equipment of potentially several telephone exchanges, each serving a certain geographical area which may also be referred to as the exchange.

In operation, the calling system 110 may place a call to the receiving system 150 via the interconnections generated and/or established by the central offices 120 and 140 and the network 130. According to various aspects, the receiving system 150 may include a microcontroller circuit as further described herein which includes a circuit board that is floating with respect to ground. An example of the microcontroller circuit that may be included within the receiving system 150 is further described with respect to FIG. 2.

Figure 2:
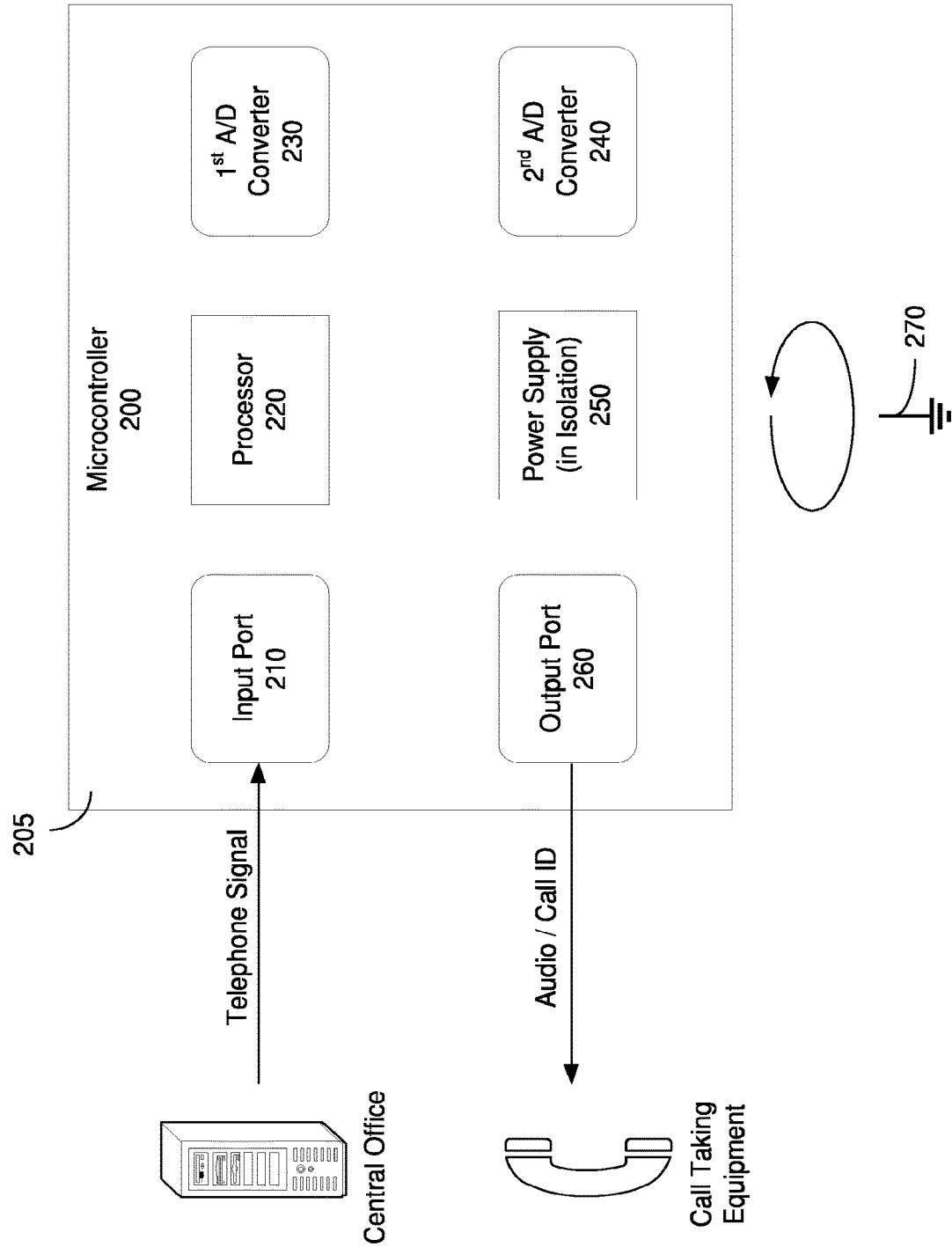
FIG. 2 is a diagram illustrating a microcontroller for detecting AC and DC signals from a phone line in accordance with an example embodiment.

FIG. 2 illustrates a microcontroller 200 for detecting AC and DC signals from a phone line in accordance with an example embodiment. Referring to FIG. 2, the microcontroller 200 includes an electronic circuit board 205 that is floating with reference to ground 270. In other words, the electronic circuit board 205 may have a voltage passing through that is not grounded to earth or via another circuit. The circuit board 205 includes an input port 210 for receiving a telephone signal such as from a central office or another system or device. The circuit board 205 also includes an output port 206 for outputting information detected from the phone signal (e.g., ringing voltage, caller ID, audio, etc.) to call taking equipment such as a phone, a headset, a handset, a computing system, and the like. The microcontroller 200 may be embedded within a telephone, or it may be electronically coupled to the telephone in some way such as through cables, wires, or the like.

The microcontroller 200 further includes a processor 220 which may control the overall operation of the other components of the microcontroller 200. As a non-limiting example, the processor 220 may include a field-programmable gate array (FPGA), an application-specific integrated circuit (ASIC), or the like, but is not limited to a particular type of processing device or circuit. The microcontroller further includes a first A/D converter 230 and a second A/D converter 240 for detecting DC and AC voltages, respectively, from the received telephone signal. The microcontroller 200 also includes a power source 250 which may be a DC power source or the like, and may be used to maintain a 1500V in isolation between the line and the circuitry of the phone. Although not shown in FIG. 2, the microcontroller 200 may further include impedance matching circuitry to improve signal quality.

According to various aspects, the electronic circuit 205 is floating with reference to ground 270. The first A/D converter 230 may be coupled to the electronic circuit 205 and configured to detect ringing voltages from DC voltages included in the telephone line. The second A/D converter 240 may be coupled to the electronic circuit 205 and configured to detect caller identification information from AC voltages included in the telephone line. The processor 220 may be coupled to the electronic circuit 205 and configured to control signals detected by the first and second A/D convertors 230 and 240 and output information about the signals, via output port 260, to call taking equipment. In the example of FIG. 2, the microcontroller 200 further includes the power source 250 coupled to the electronic circuit 205 and configured to maintain a voltage of 1500 volts in isolation between the telephone line and the call taking equipment.

According to various aspects, the first A/D converter 230 may detect high voltage signals from the DC voltages while the second A/D converter 240 may detect lower voltage signals from the AC voltages. In some embodiments, the first A/D converter 230 may further detect a polarity of a voltage indicating a state of the telephone line and DC signaling from the central office. In some embodiments, the second A/D converter 240 may be further configured to detect audio transmitted during a phone call and on-hook transmissions transmitted between calls. In some embodiments, the processor 220 may be further configured to output the detected caller ID information to a display device of the call taking equipment. In some embodiments, although not shown specifically in FIG. 2, the microcontroller 200 may further include a central processing unit (CPU), a memory, and a plurality of additional input/output ports for attaching to and receiving communications from other components and devices.

To eliminate the issue of common mode rejection ratio (CMRR), the microcontroller 200 can monitor AC voltages on the line while maintaining a very high CMRR. The circuit board 250 may also maintain a 1500V isolation between the line side and the circuitry side to withstand any voltage surges that can occur on the telephone line. The microcontroller 200 is also small and low cost. In addition to monitoring AC voltages, the microcontroller can monitor the DC voltage as well thereby providing a complete line monitoring solution. The power source may generate a micro power microcontroller 200 using an isolated DC power source. The microcontroller 200 is floating referenced to ground and therefore presents a very good CMRR. The first A/D converter 230 can monitor on a high voltage scale that will be used to measure ringing voltages and DC voltages. Furthermore, the first A/D converter 230 can detect a polarity of a battery voltage to indicate the state of the line and detect DC signaling from the central office. The second A/D converter 240 can small signals and may be used to measure the AC voltages in the voice band for detection of the caller ID information but also the audio transmitted and received during a phone call or between calls (on-hook transmission).

Because of the requirement to be isolated from the telephone line at 1500V, the circuitry that is connected to the telephone line must have a galvanic isolation from the rest of the telephone circuit. This means that the wall transformer powering the telephone circuit cannot power the isolated portion connected to the telephone line. In addition, any active circuitry (circuitry that requires power to operate) connected to the telephone line requires a source of power that is also isolated at 1500V to provide the required safety. For that reason, the microcontroller cannot be part of the telephone line, it must be part of the telephone equipment. Meaning that it must be within the telephone enclosure. The challenge is to power the microcontroller circuit while maintaining the product as small and compact as possible and maintain the 1500V isolation at the same time. Not only that, but the audio and control signals from the microcontroller must be transmitted to the "low voltage" side of the telephone circuit while maintaining the 1500V isolation.

The line side circuit has low power components that continually "listen" to the telephone line and digitize (render them digital) the AC and DC signals to send them to the "low voltage" side of the telephone equipment. This circuit includes the microcontroller itself, monitoring circuits made of instrumentation amplifiers and anti-aliasing filters made with operational amplifiers. The microcontroller sends the digitized signal serially over the isolation barrier toward the low voltage side.

The "circuitry side" is the "low voltage side" that is isolated from the telephone line and safe. That portion of the circuit is made of a CPLD (Complex Programmable Logic Device) that takes the serial signal from the microcontroller and formats it so that it can be recognized and treated by the processor and transformed back into voice or analyzed to detect call progress tones (e.g. dial tone, busy tone, ring back tone, etc.)

Common practice in the industry for the detection of caller ID information is to use either an isolation transformer or a DAA (Data Access Arrangement). While the transformer solution provides a very good CMRR, it is bulky and does not allow detection of the DC battery presence and/or polarity. The DAA provides a small footprint, but it does not provide a battery polarity detection and the presence of DC battery when on-hook. It also presents a lower CMRR that causes issues in the presence of high levels of common mode signals.

By monitoring the DC voltage, the microcontroller herein can detect its polarity, which is necessary for some functionalities, such as CAMA (Centralized Automatic Message Accounting), or E911 call taking applications, where a battery reversal when off-hook means that the Central Office (CO) is ready to receive tone signaling information and battery reversal when on-hook means the CO trunk for that line is out of service. The microcontroller can also detect the presence or absence of a DC battery. The absence of battery when on-hook means that the line is not connected or in trouble, so we should not use it. The absence of battery when off-hook can be used by some CO for signaling purposes. The AC detection in the on-hook state is used for caller ID transmission or for on-hook transmission of data. The AC detection in the off-hook state is used for the monitoring and/or recording of the emergency call without disturbing the call.

To meet UL requirements for call taking equipment, it must be grounded to the building ground. This causes detection problems when there are high levels of common mode signals on the telephone line. A circuit that is floating referenced to ground is practically speaking completely isolated from ground and the building ground has no effect or impact on the signal being measured on the telephone line. A circuit that is floating is usually rated at a certain voltage, meaning that if the difference of potential (voltage) between that circuit and ground is increased past that rating, the isolation is in danger of failing and causing a conduction to ground.

Figure 3:
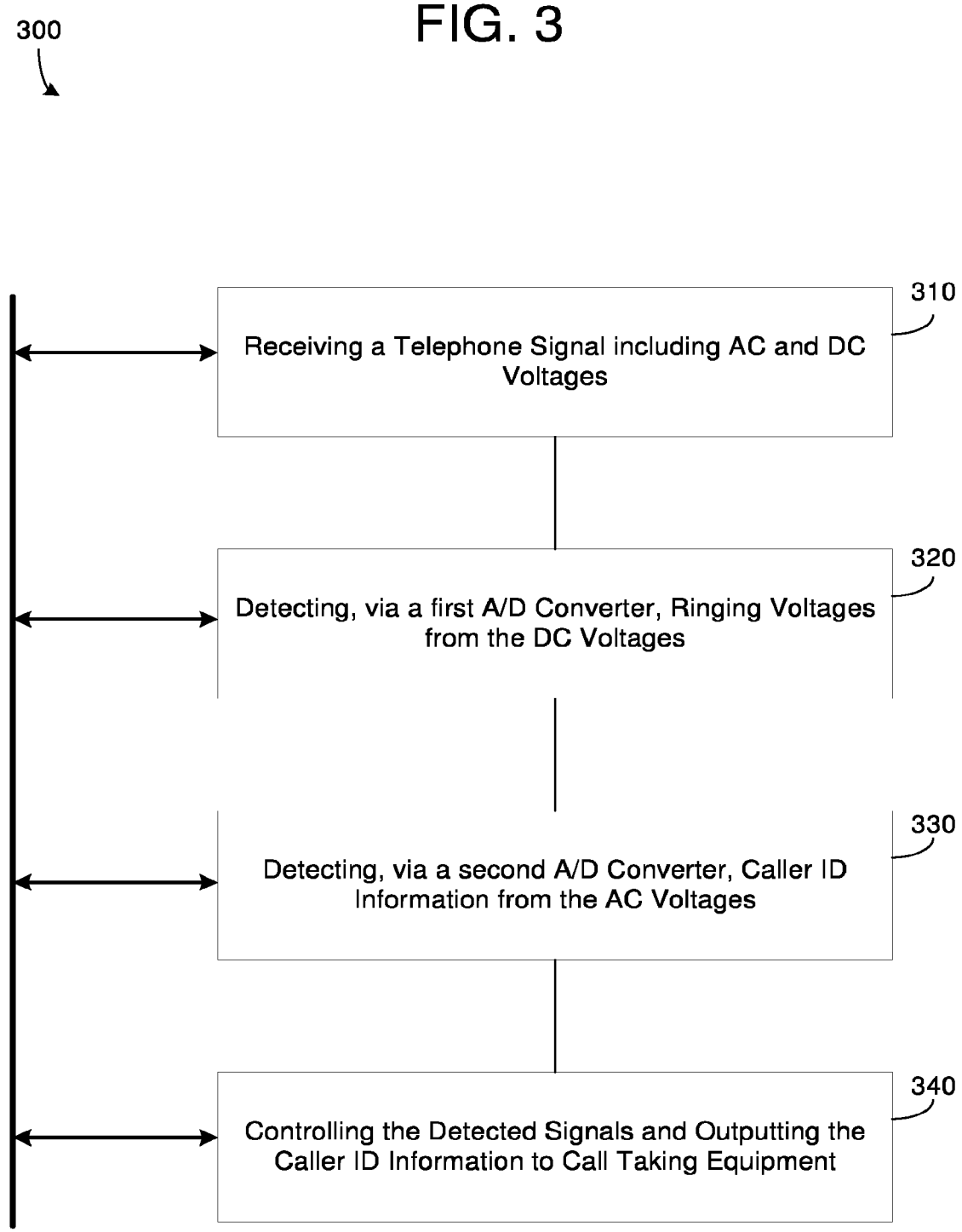
FIG. 3 is a diagram illustrating a method for detecting AC and DC signals from a telephone line in accordance with an example embodiment.

FIG. 3 illustrates a method 300 for detecting AC and DC signals from a telephone line in accordance with an example embodiment. For example, the method 300 may be performed by a microcontroller (e.g., microcontroller 200, etc.), a telephone, a computing system, a combination thereof, and/or the like. In 310, the method includes receiving a telephone signal via a telephone line between call taking equipment and a central office. For example, the telephone signal may include AC voltage and DC voltage that can be read by the microcontroller. The telephone signal may be received via an input port of the microcontroller such as a phone line port, an ethernet port, a cable port, and the like. The microcontroller (or other system performing the method) may be integrated within or otherwise coupled to a telephone system.

In 320, the method includes detecting, via a first A/D converter, ringing voltages from DC voltages included in the telephone signal, and in 330, the method includes detecting, via a second A/D converter, caller identification information from AC voltages included in the telephone signal. Furthermore, in 340 the method includes controlling, via a processor, signals detected by the first and second A/D convertors and outputting information about the signals to the call taking equipment. The components performing the method 300 such as the first A/D converter, the second A/D converter, and the processor, may be electronically connected to each other and coupled to an electronic circuit that is floating with reference to ground.

Although not shown in FIG. 3, in some embodiments the method may further including maintaining a voltage of 1500 volts in isolation between the telephone line and the call taking equipment. In some embodiments, the method may further include detecting, via the first A/D converter, a polarity of a voltage from the telephone line indicating a state of the telephone line and DC signaling from the central office. In some embodiments, the method may further include detecting, via the second A/D converter, audio transmitted during a phone call, and outputting the detected audio to the call taking equipment.

The above embodiments may be implemented in hardware, in a computer program executed by a processor, in firmware, or in a combination. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 4:
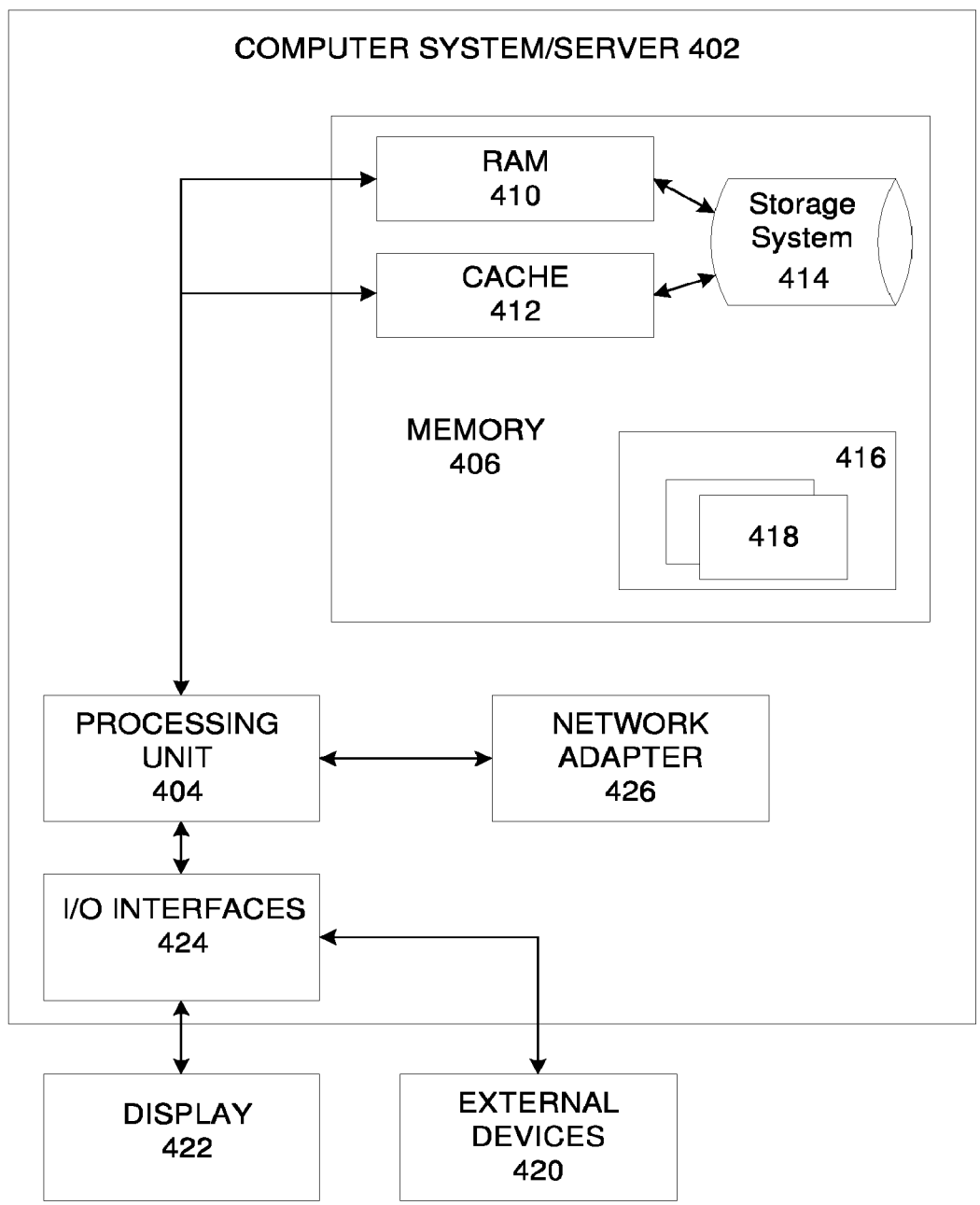
FIG. 4 is a diagram illustrating a computing system in accordance with an example embodiment.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 4 illustrates an example computer system architecture 400, which may represent or be integrated in any of the above-described components, etc. The computer system 400 may be a single device or a combination of devices. For example, the computer system 400 may be a computing system that executes one or more software applications for use by an emergency call taking position such as call-talking software, geographical mapping software, dispatching software, and the like, that are used by emergency services for answering emergency calls. As one example, the computing system 400 may be included in the receiving system 150.

FIG. 4 is not intended to suggest any limitation as to the scope of use or functionality of embodiments of the application described herein. Regardless, the computing system 400 (or node 400) is capable of being implemented and/or performing any of the functionality set forth hereinabove.

In computing node 400 there is a computer system/server 402, which is operational with numerous other general purpose or special purpose computing system environments or configurations. Examples of well-known computing systems, environments, and/or configurations that may be suitable for use with computer system/server 402 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in computing node 400 is shown in the form of a general-purpose computing device. The components of computer system/server 402 may include, but are not limited to, one or more processors or processing units 404 (i.e., processors), a system memory 406, and a bus that couples various system components including system memory 406 to processor 404. The computing node 400 may be the computing system shown in the call taking station 150 of FIG. 1, a computing system associated with a central office, or another device or combination of devices such as a server, cloud platform, database, and/or the like.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media. System memory 406, in one embodiment, implements the flow diagrams of the other figures. The system memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 414 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 406 may include at least one program product having a set (e.g., at least one) of program modules that are configured to carry out the functions of various embodiments of the application.

Program/utility 416, having a set (at least one) of program modules 418, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. Program modules 418 generally carry out the functions and/or methodologies of various embodiments of the application as described herein. In some embodiments, the program modules 418 may include software components for an emergency call taking position that interacts with telephone equipment used by an operator or other emergency call taking user.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 402 may also communicate with one or more external devices 420 such as a keyboard, a pointing device, a display 422, etc.; one or more devices that enable a user to interact with computer system/server 402; and/or any devices (e.g., network card, modem, etc.) that enable computer system/server 402 to communicate with one or more other computing devices. Such communication can occur via I/O interfaces 424. Still yet, computer system/server 402 can communicate with one or more networks such as a local area network (LAN), a general wide area network (WAN), and/or a public network (e.g., the Internet) via network adapter 426 (also referred to as a network interface). As depicted, network adapter 426 communicates with the other components of computer system/server 402 via a bus. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

Although an exemplary embodiment of at least one of a system and method has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

The invention claimed is:

1. An alternating current and direct current (AC/DC) telephone line detection system, the system comprising:
    an electronic circuit that is floating with reference to ground;
    a first analog-to-digital (A/D) converter coupled to the electronic circuit and configured to:
        detect ringing voltages from DC voltages carried by a telephone line, and
        detect a state of the telephone line based on a polarity of a DC signal from a battery;
    a second A/D converter coupled to the electronic circuit and configured to:
        detect caller identification information from AC voltages carried by the telephone line, the second A/D converter further configured to detect audio transmitted during a phone call and on-hook transmissions transmitted between calls; and a processor configured to:
output information about signals detected by the first A/D converter and the second A/D converter.

2. The AC/DC telephone line detection system of claim 1, further comprising:
a power source coupled to the electronic circuit and configured to provide an isolation of 1500 volts minimum.

3. The AC/DC telephone line detection system of claim 2, wherein:
the processor is configured to output the information about the signals to call taking equipment; and
the power source is configured to provide an isolation of 1500 volts between the telephone line and the call taking equipment.

4. The AC/DC telephone line detection system of claim 1, wherein the first A/D converter is configured to:
detect high voltage signals from the DC voltages, the second A/D converter is configured to detect low voltage signals from the AC voltages, and the high voltage signals have higher voltages than the low voltage signals.

5. The AC/DC telephone line detection system of claim 1, wherein the electronic circuit is included in a microcontroller that includes a central processing unit, a memory, and a plurality of input/output ports that are embedded on the electronic circuit.

6. The AC/DC telephone line detection system of claim 1, wherein the first A/D converter is further configured to:
detect a polarity of DC signaling from a central office (CO).

7. The AC/DC telephone line detection system of claim 1, wherein the processor is further configured to:
output the detected caller ID information to a display device of the call taking equipment.

8. A telephone system, comprising:
a microcontroller configured to detect caller identification (ID) information from a telephone line being input to the telephone system and output the detected caller ID information to a display, wherein the microcontroller comprises:
an electronic circuit that is floating with reference to ground;
a first analog-to-digital (A/D) converter coupled to the electronic circuit and configured to:
detect ringing voltages from DC voltages carried by a telephone line, and
detect a state of the telephone line based on a polarity of a DC signal from a battery;
a second A/D converter coupled to the electronic circuit and configured to:
detect caller identification information from AC voltages carried by the telephone line, the second A/D converter further configured to detect audio transmitted during a phone call and on-hook transmissions transmitted between calls; and
a processor configured to:
output information about signals detected by the first A/D c converter and the second A/D converter.

9. The telephone system of claim 8, wherein the telephone system is included within a public-safety access point (PSAP) for receiving emergency phone calls.

10. The telephone system of claim 8, wherein the microcontroller further comprises:
a power source coupled to the electronic circuit and configured to provide an isolation of 1500 volts minimum.

11. The telephone system of claim 10, wherein:
the processor is configured to output the information about the signals to call taking equipment; and
the power source is configured to provide an isolation of 1500 volts between the telephone line and the call taking equipment.

12. The telephone system of claim 8, wherein:
the first A/D converter is configured to detect high voltage signals from the DC voltages,
the second A/D converter is configured to detect low voltage signals from the AC voltages, and
the high voltage signals have higher voltages than the low voltage signals.

13. The telephone system of claim 8, wherein the electronic circuit comprises:
a central processing unit, a memory, and a plurality of input/output ports.

14. The telephone system of claim 8, wherein the first A/D converter is further configured to:
detect a polarity of DC signaling from a central office (CO).

15. A method, comprising:
receiving a telephone signal via a telephone line communicably coupled to a central office, the telephone signal comprising alternating current (AC) and direct current (DC) voltages;
detecting, via a first analog-to-digital (A/D) converter, ringing voltages from DC voltages of the telephone signal;
detecting, via a first analog-to-digital (A/D) converter a state of the telephone line based on a polarity of a DC signal from a battery;
detecting, via a second A/D converter, caller identification information from AC voltages of the telephone signal;
detecting, via the second A/D converter, audio transmitted during a phone call and on-hook transmissions transmitted between calls; and
controlling, via a processor, signals detected by first A/D converter and the second A/D converter,
wherein the first A/D converter, the second A/D converter, and the processor, are electronically connected to each other and coupled to an electronic circuit that is floating with reference to ground.

16. The method of claim 15, wherein the method further comprises:
providing an isolation of 1500 volts minimum between the telephone line and call taking equipment.

17. The method of claim 16, further comprising:
detecting, via the second A/D converter, audio transmitted during a phone call, and outputting the detected audio to the call taking equipment.

18. The method of claim 15, further comprising:
detecting, via the first A/D converter, a polarity of DC signaling from the central office.

* * * * *